US012754946B2

(12) United States Patent
Hoch et al.

(10) Patent No.: US 12,754,946 B2
(45) Date of Patent: Oct. 6, 2026

(54) MULTI-TOPIC BATCHING FOR LLM BASED TEXT CLASSIFICATION

(71) Applicant: NEC Corporation Of America, Herzlia (IL)

(72) Inventors: Yaacov Hoch, Ramat-Gan (IL); Yoav Badikhi, Rehovot (IL); Nisim Machluf, Ashkelon (IL); Naomi Sara Kirshner, Tel Aviv (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 19/074,589

(22) Filed: Mar. 10, 2025

(65) Prior Publication Data

US 2026/0267904 A1 Sep. 10, 2026

(51) Int. Cl.
*G06F 16/353* (2025.01)

(52) U.S. Cl.
CPC .................................. *G06F 16/353* (2019.01)

(58) Field of Classification Search
CPC ..................................................... G06F 16/353
See application file for complete search history.

(56) References Cited

U.S. PATENT DOCUMENTS

| | | | | |
|---|---|---|---|---|
| 9,672,556 | B2 * | 6/2017 | Welch | G06F 16/353 |
| 10,339,160 | B2 * | 7/2019 | Starr | G06F 16/353 |
| 12,271,707 | B1 * | 4/2025 | Sivulka | G06F 16/243 |
| 2022/0188337 | A1 * | 6/2022 | Starr | G06F 16/353 |
| 2025/0111147 | A1 * | 4/2025 | Pryzant | G06F 40/20 |
| 2025/0217603 | A1 * | 7/2025 | Mangalam | G06F 40/284 |
| 2025/0225335 | A1 * | 7/2025 | Ma | G06F 40/40 |
| 2025/0348740 | A1 * | 11/2025 | Zheng | G06N 3/0895 |
| 2025/0363327 | A1 * | 11/2025 | Osi | G06N 3/042 |

* cited by examiner

*Primary Examiner* — Debbie M Le

(57) ABSTRACT

There is provided a method of classifying a text, comprising: accessing a text for classification into a class defined as a super-category of topics, wherein each topic is associated with at least one prompt for determining whether the text corresponds to the respective topic or not, in iterations: feeding a batch of prompts from topics defined as being in an active state into a LLM, analyzing replies generated by the LLM to determine whether the text is classified into each respective topic or not, changing to an inactive state for a subset of the topics to which the text is classified into respective topics, wherein in a subsequent iteration another batch is selected from topics in the active state, and classifying or not classifying the text into the class according to an analysis of an aggregation of the subset of the topics for which the active state was changed.

19 Claims, 6 Drawing Sheets

***Mult − Topic Batching Algorithm*:**

***Inputs*:** *Batch size* $S, T = \{t_i\}_{i=1}^{K}$, *a list of topics.*

$N = \{n_{t_i}\}_{i=1}^{K}$ *number of questions per topic.*

***Initialization*:**

$C = \{c_i\}_{i=1}^{L}$, *a collection of counters for each topic*

*For* $i = 1 \ldots K$ *do;*

$t_i \leftarrow active$ $c_i \leftarrow 0$

*end*

*While* $sum(C) < sum(N)$ *do;*

$B, A \leftarrow collection(T, S, C)$ $R \leftarrow LLM.answer(B)$ $update(T, A, R, S)$

*end*

*Question ensembling*

302

FIG. 3A

```
Collection Step:
Inputs: T(topic list), S(batch size), C(questions counters)
Outputs: a batch of propmps.

Initialization: B ← emply list (container for batched questions)
A ← empty list (container for questions allocation).

while size(B) < S:
  For i = 1 ... K;
    t ← T[i]
    if t is active:
      c ← C[i]
      B ← B + t.questions[c]
      A ← A + (i, c)
      C[i] ← c + 1
       if C[i] == N[i]:  //last question reached
         t ← inactive
    if size(B) == S:
      break
  end
  if all topics incative:  //allow partial batch
    break
end
Return B, A
```

Collection

304

FIG. 3B

```
Update Step
Inputs: T, A, R, S
For j = 1 ... S do;
  r ← R[j]
  i, c ← A[j]
  t ← T[i]
  if r:  //question positively answered
    t ← inactive
end
```

Update

306

FIG. 3C

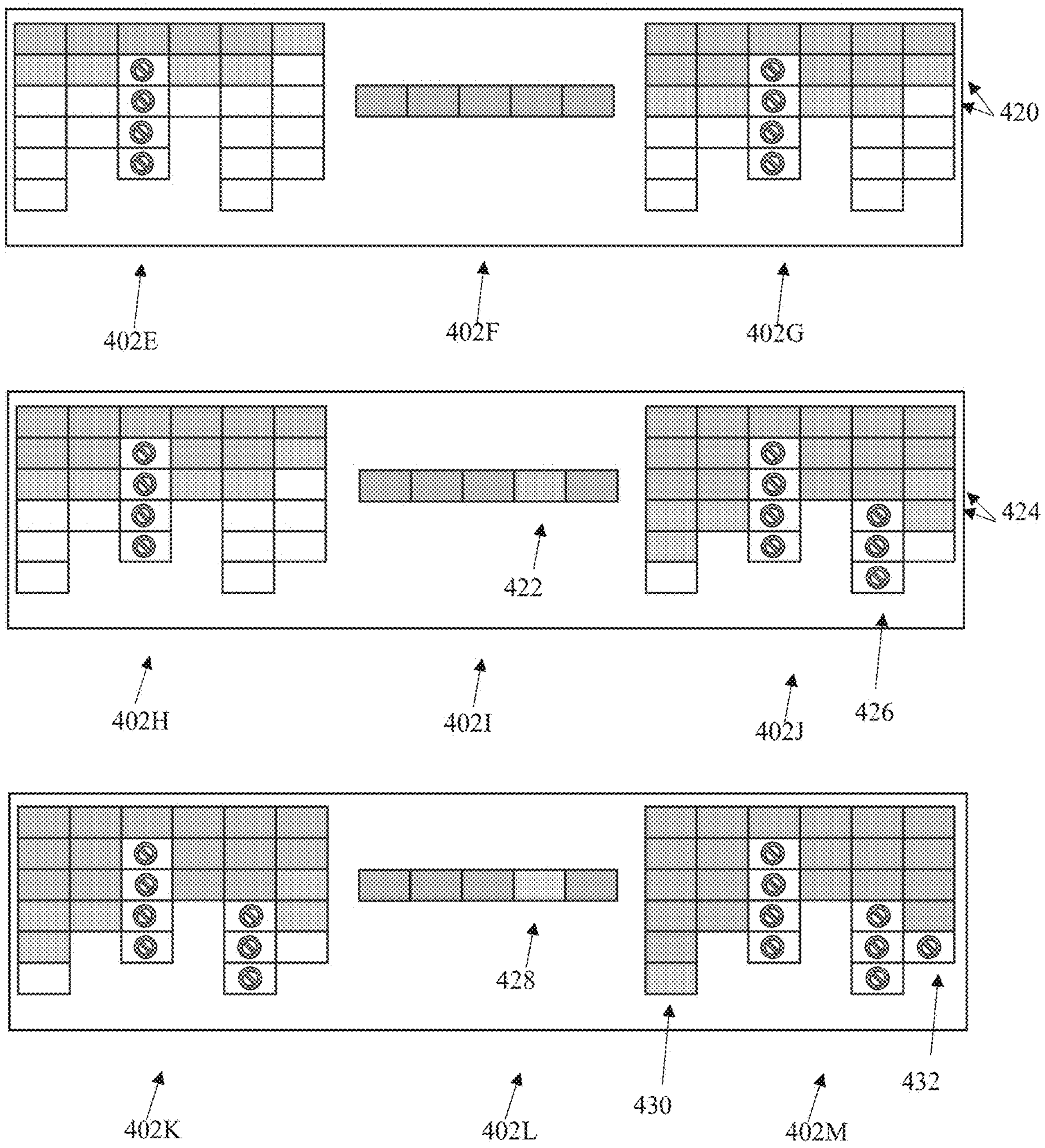
FIG. 4 - continued

MULTI-TOPIC BATCHING FOR LLM BASED TEXT CLASSIFICATION

BACKGROUND

The present invention, in some embodiments thereof, relates to classification and, more specifically, but not exclusively, to systems and methods for classification of a text.

The process of text classification may include assigning a predefined category to a text. Text classification may be performed, for example, by preprocessing (e.g., tokenization, stop-word removal), feature extraction (e.g., TF-IDF, embeddings), and using machine learning or deep learning models (e.g., Naive Bayes, SVMs, neural networks) to make predictions. Application of text classification include, for example, spam detection, sentiment analysis, and topic categorization.

SUMMARY

According to a first aspect, a computer implemented method of classifying a text, comprises: accessing a text for classification into a class, wherein the class is defined as a super-category of a plurality of topics, wherein each respective topic of the plurality of topics is associated with at least one prompt for determining whether the text corresponds to the respective topic or not, in a plurality of iterations: obtaining a batch of a plurality of prompts, wherein the plurality of prompts correspond to the plurality of topics of the class, wherein the plurality of topics are obtained from topics defined as being in an active state, feeding the batch to a large language model (LLM), analyzing replies generated by the LLM in response to the batch to determine whether the text is classified into each respective topic of the plurality of topics or not, changing from the active state to an inactive state for a subset of the plurality of topics to which the text is classified into respective topics according to the analysis, wherein in a subsequent iteration another batch is selected from topics remaining in the active state, and classifying the text into the class or not classifying the text into the class according to an analysis of an aggregation of the subset of the plurality of topics for which the active state was changed to the inactive state.

According to a second aspect, a system for classifying a text, comprises: at least one processor executing a code for: accessing a text for classification into a class, wherein the class is defined as a super-category of a plurality of topics, wherein each respective topic of the plurality of topics is associated with at least one prompt for determining whether the text corresponds to the respective topic or not, in a plurality of iterations: obtaining a batch of a plurality of prompts, wherein the plurality of prompts correspond to the plurality of topics of the class, wherein the plurality of topics are obtained from topics defined as being in an active state, feeding the batch to a large language model (LLM), analyzing replies generated by the LLM in response to the batch to determine whether the text is classified into each respective topic of the plurality of topics or not, changing from the active state to an inactive state for a subset of the plurality of topics to which the text is classified into respective topics according to the analysis, wherein in a subsequent iteration another batch is selected from topics remaining in the active state, and classifying the text into the class or not classifying the text into the class according to an analysis of an aggregation of the subset of the plurality of topics for which the active state was changed to the inactive state.

According to a third aspect, a non-transitory medium storing program instructions for classifying a text, which when executed by at least one processor, cause the at least one processor to: access a text for classification into a class, wherein the class is defined as a super-category of a plurality of topics, wherein each respective topic of the plurality of topics is associated with at least one prompt for determining whether the text corresponds to the respective topic or not, in a plurality of iterations: obtain a batch of a plurality of prompts, wherein the plurality of prompts correspond to the plurality of topics of the class, wherein the plurality of topics are obtained from topics defined as being in an active state, feed the batch to a large language model (LLM), analyze replies generated by the LLM in response to the batch to determine whether the text is classified into each respective topic of the plurality of topics or not, change from the active state to an inactive state for a subset of the plurality of topics to which the text is classified into respective topics according to the analysis, wherein in a subsequent iteration another batch is selected from topics remaining in the active state, and classify the text into the class or not classifying the text into the class according to an analysis of an aggregation of the subset of the plurality of topics for which the active state was changed to the inactive state.

In a further implementation form of the first, second, and third aspects, classifying the text into the class is performed in response to the analysis determining that the text is classified into at least one topic of the plurality of topics of the class.

In a further implementation form of the first, second, and third aspects, analyzing replies comprises classifying the into each respective topic by a respective deterministic binary classifier trained for the topic according to an input of the replies of the LLM to the at least one prompt, wherein the text is classified into the class according to an analysis of the outcomes of a plurality of deterministic binary classifiers corresponding to the plurality of topics.

In a further implementation form of the first, second, and third aspects, further comprising adding the classified text to a corpus of classified texts.

In a further implementation form of the first, second, and third aspects, the corpus of classified texts is arranged for at least one of: being searched by a search engine, being accessed by an index according to classification, and for a text to be presented on a display in association with classification of the text.

In a further implementation form of the first, second, and third aspects, the plurality of iterations terminate when the plurality of topics are in the inactive state, or no prompts remain.

In a further implementation form of the first, second, and third aspects, when a size of the batch is less than a number of the plurality of topics in the active state, a single prompt of the plurality of prompts of the batch corresponds to a single topic.

In a further implementation form of the first, second, and third aspects, when a size of the batch is less than a number of the plurality of topics in the active state, the plurality of prompts are obtained from different combination of topics, wherein the plurality of iterations are over the plurality of topics in the active state.

In a further implementation form of the first, second, and third aspects, when a size of the batch is larger than a number of the plurality of topics in the active state, at least two prompts corresponding to a same topic are included in the batch.

In a further implementation form of the first, second, and third aspects, the text is unstructured.

In a further implementation form of the first, second, and third aspects, the prompt comprises a question and the reply generated by the LLM comprises an answer to the question.

In a further implementation form of the first, second, and third aspects, the at least one prompt associated with the respective topic comprises a plurality of prompts, including at least one disqualifying prompt designed to disqualify the text from corresponding to the respective topic and at least one qualifying prompt designed to verify that the text corresponds to the respective topic.

In a further implementation form of the first, second, and third aspects, analyzing the replies generated by the LLM comprises determining whether each reply generated by the LLM disqualifies the text for the respective topic or verifies that the text corresponds to the respective topic, and changing the state of the respective topic to the inactive state in response to the determining indicating that the text is disqualified or verified.

In a further implementation form of the first, second, and third aspects, the at least one prompt associated with the respective topic comprises a plurality of prompts arranged such that a reply generated by the LLM to a prompt obtained in a current iteration is based on at least one preceding reply generated by the LLM in response to at least one preceding prompt obtained in at least one preceding iteration.

In a further implementation form of the first, second, and third aspects, the analyzing the replies generated by the LLM is performed by a binary classifier that determines whether the text corresponds to the respective topic or not, wherein a different binary classifier is trained for each respective topic.

In a further implementation form of the first, second, and third aspects, the text is fed into the LLM in combination with the batch at least in an initial iteration of the plurality of iterations.

In a further implementation form of the first, second, and third aspects, the plurality of iterations are executed for each text of a plurality of texts for classifying the plurality of texts.

In a further implementation form of the first, second, and third aspects, the plurality of iterations are executed for each class of a plurality of classes for identifying a subset of the plurality of classes that the text is classified to, each class is defined as the super-category of a different set of topics, wherein each respective topic of each class is associated with at least one different prompt for determining whether the text corresponds to the respective topic or not.

In a further implementation form of the first, second, and third aspects, classification of the text into each class is implemented as a binary outcome.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A is a pseudocode for generating a batch of prompts of different topics for feeding into the LLM, in accordance with some embodiments of the present invention;

FIG. 3B is a pseudocode for feeding the batch of prompts into the LLM, and collecting the responses generated by the LLM, in accordance with some embodiments of the present invention;

FIG. 3C is a pseudocode for determining whether each topic is qualified or disqualified according to the respective response, and a state of the topic is changed to inactive accordingly, in accordance with some embodiments of the present invention.

DETAILED DESCRIPTION

Figure 1:
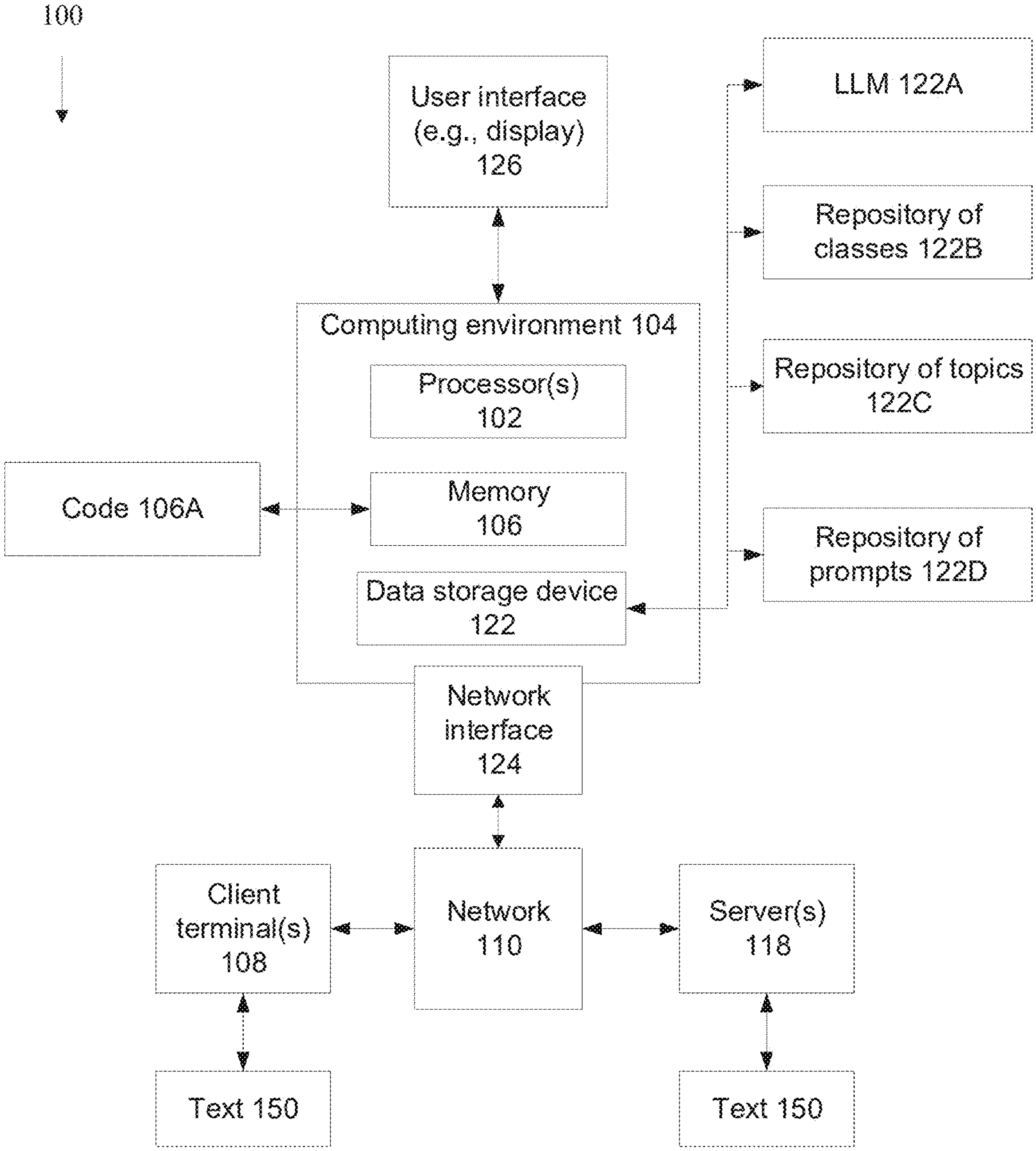
FIG. 1 is a block diagram of components of a system for classifying a text using a LLM, in accordance with some embodiments of the present invention.

The present invention, in some embodiments thereof, relates to classification and, more specifically, but not exclusively, to systems and methods for classification of a text.

An aspect of some embodiments of the present disclosure relates to systems, methods, computing devices, and/or code instructions (stored on a data storage device and executable by one or more processors) for classifying a text into a class. Each class is defined as a super-category of multiple topics. A text classified into at least one topic of the multiple topics may be considered as belonging to the class. Each respective topic is associated with at least one prompt for determining whether the text corresponds to the respective topic or not. The classification for each class may be binary, where each class is associated with its own set of topics and corresponding prompts. The prompt may be in the form of a question. The following features are iterated: A batch of prompts in an active state are obtained. The prompts correspond to the topics of the class. The batch of prompts is fed to a large language model (LLM). Replies generated by the LLM are analyzed to determine whether the text is classified into each respective topic or is not classified into each respective topic. The prompts may include questions of a first qualifying type that classify the text into the topic when a positive answer is received from the LLM. The prompts may include questions of a second disqualifying type that exclude the text from the topic when a positive answer is received from the LLM. The active state of a subset of topics is changed to an inactive state in response to the analysis. The state is changed to the inactive state for topics into which the text is classified, such as by verifying that the text belongs to the topic or for which the text is excluded from the topic. Topics for which no conclusion is reached on whether the text corresponds to the topic or not based on the response of the LLM remain in the active state. The iterations are terminated when the all of the topics are in the inactive state, or no prompts remain. The text is classified into the class according to an analysis of an aggregation of the subset of topics for which the state was changed from active to inactive. For example, a set of rules is applied to the topics that were found to correspond to the text to classify the text into the class. The classification of the text into the class may be considered a binary classification. Action may be taken in response to the classification of the text. For example, a classification tag/label may be generated and assigned to the text, for example, to enable a fast lookup such as by a search engine. In another example, the classified text may be added to a corpus of texts associated with the same class.

Optionally, the text is classified into each respective topic by a respective deterministic binary classifier trained for the topic according to an input of the response of the LLM to the prompt(s). The text may be is classified into the class according to an analysis of the outcomes of multiple deterministic binary classifiers corresponding to the multiple topics. For example, the text is classified into the class when the text is classified into a certain combination of topics. The binary classifiers may be based on a LLM prompt-ensemble approach. According to this approach an LLM is prompted with a text and a collection of questions to extract useful information for making the classification, as described herein.

At least one embodiment described herein addresses the technical problem of improving efficiency of a computer classifying a text into a class, optionally selected from multiple classes. At least one embodiment described herein improves the technical field of automated classification of text, by improving efficiency of a computer classifying a text into a class, optionally selected from multiple classes. At least one embodiment described herein improves upon prior approaches of classifying a text into a class. At least one embodiment described herein provides the practical application of using a LLM to classify a text into a class, in contrast for example, to training a classifier of a training dataset for classifying the text. At least one embodiment described herein provides the practical application of improving efficiency of a computer classifying the text into the class.

Classifying of text into a class may be performed using different approaches. In one standard approach, a training dataset is generated. The training dataset includes different texts, each labelled with a ground truth indicating the classification class. A classifier is trained on the training dataset. Creating training datasets, training classifiers, and/or performing inference with the trained classifiers is computationally inefficiency for a computer, requiring significant data storage, memory, processing time, and/or utilization of processing resources.

At least one embodiment described herein solves the aforementioned technical problem by, and/or improves upon the aforementioned technical field by, and/or improves upon prior approaches by, and/or provides the practical application of, using a LLM to classify a text. The LLM may be a pre-existing LLM, which may not even have been trained specifically to classify text into the desired class(es). A training dataset does not need to be created, and/or a classifier does not need to be trained on the training dataset. Using the LLM, such as rather than training and/or using a classifier, improves computational efficiency of a computer performing the classification, in particular where the LLM is not run by the computer, for example, the computer generates prompts which are fed to the LLM running in a computing cloud.

Classification of text into one or more classes is an important task, for example, for improving performance of search engine, for detection of spam and junk mail, enhancing performance of chatbots and recommendation systems, automatic categorization such as of articles on a news site, and the like.

At least one embodiment described herein solves the aforementioned technical problem by, and/or improves upon the aforementioned technical field by, and/or improves upon prior approaches by, and/or provides the practical application of, classifying a text into a class. Each class is defined as a super-category of multiple topics. Each respective topic is associated with at least one prompt for determining whether the text corresponds to the respective topic or not. The following features are iterated: A batch of prompts in an active state are obtained. The prompts correspond to the topics of the class. The batch of prompts is fed to a LLM. Replies generated by the LLM are analyzed to determine whether the text corresponds to each respective topic or does not correspond to the respective topic. The active state of a first subset of topics is changed to an inactive state in response to the analysis. The iterations are terminated when the all of the topics are in the inactive state, or no prompts remain. The text is classified into the class according to a second subset of topics which correspond to the text.

It may be assumed that there exists an optimal order for the prompts to feed into the LLM (e.g., questions), where optimality is defined as the minimal number of questions to be answered to reach a decision. Asking the questions one by one according to the optimal order is predicted to result in shorter inference time. Conversely, asking the questions one by one also presents a significant overhead to the system's performance, and the inference time may be optimized by asking the questions in batches, as described herein. The batches may be collated in a serial manner, where the questions of each topic are divided into blocks and asked together. Trying to naïvely combine the two aforementioned optimization methods may result in a suboptimal solution. As the former achieves optimality by traversing a tree-like question structure, where the next question is asked based on the answer of a previous one, the latter is forcing answering question in non-causal manner and will may result in redundant LLM calls.

A topic may represent an idea that encompasses a limited range of information. As a result, the text may be disqualified from the topic in an early stage of the disqualification process. In the case where a disqualification question was positively answered, there is not necessarily a need to ask any more questions, certainly qualifying ones, since the text is disqualified from the topic by the positive response to the disqualification question. On the other hand, when a qualification question is answered positively, the positive answer may be sufficient for qualifying the text for the topic and further questions may be redundant.

At least one embodiment described herein is based on feeding prompts, optionally asking the questions, in an order that may leverage the already obtained information from previously answered questions and may result in minimizing the number of calls to the LLM. Questions may be collected and asked in a layered manner. A decision to stop the questioning process for a topic may be obtained in different stages, as described herein.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
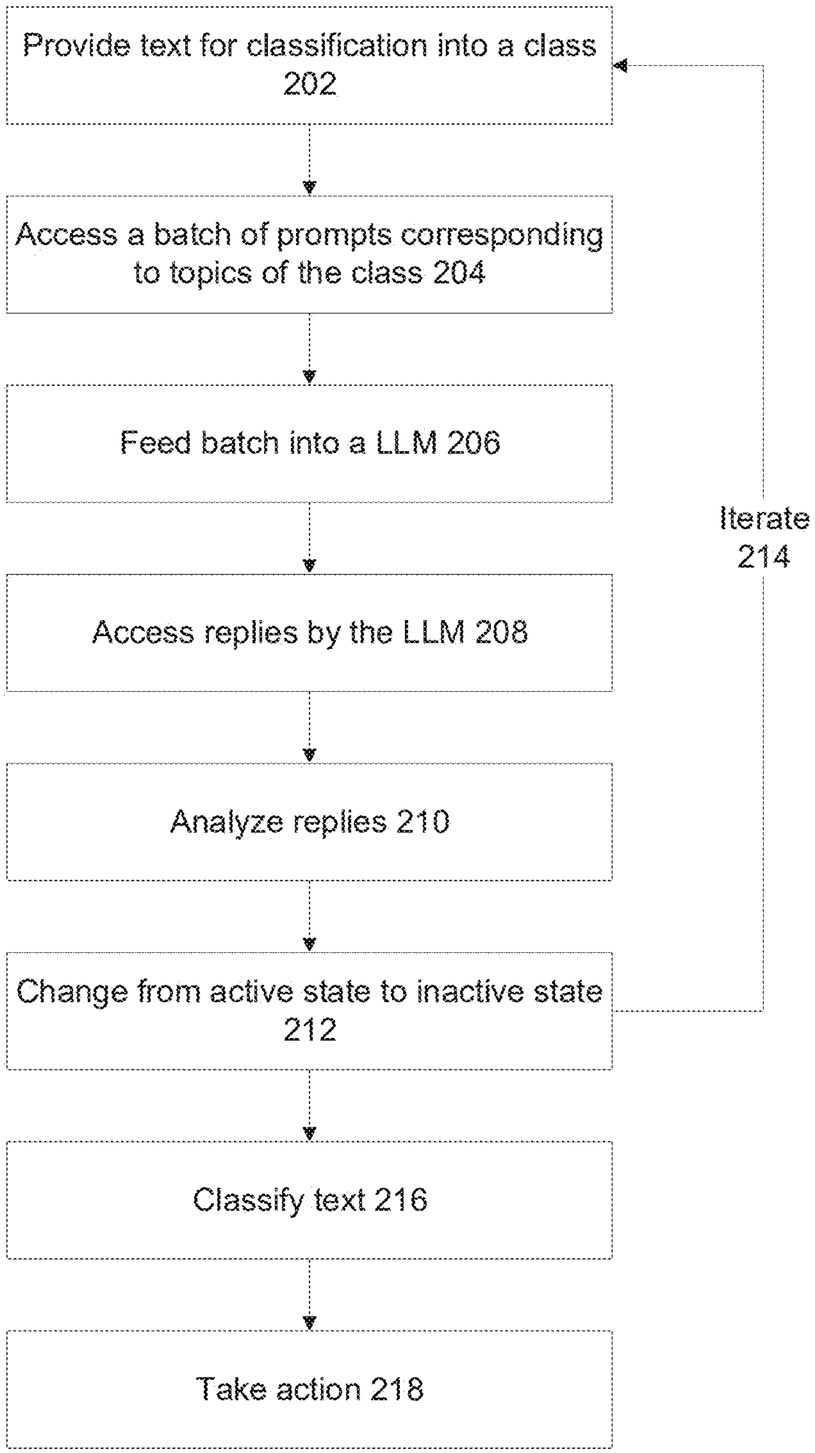
FIG. 2 is a flowchart of a method of classifying a text using a LLM, in accordance with some embodiments of the present invention.
Figure 4:
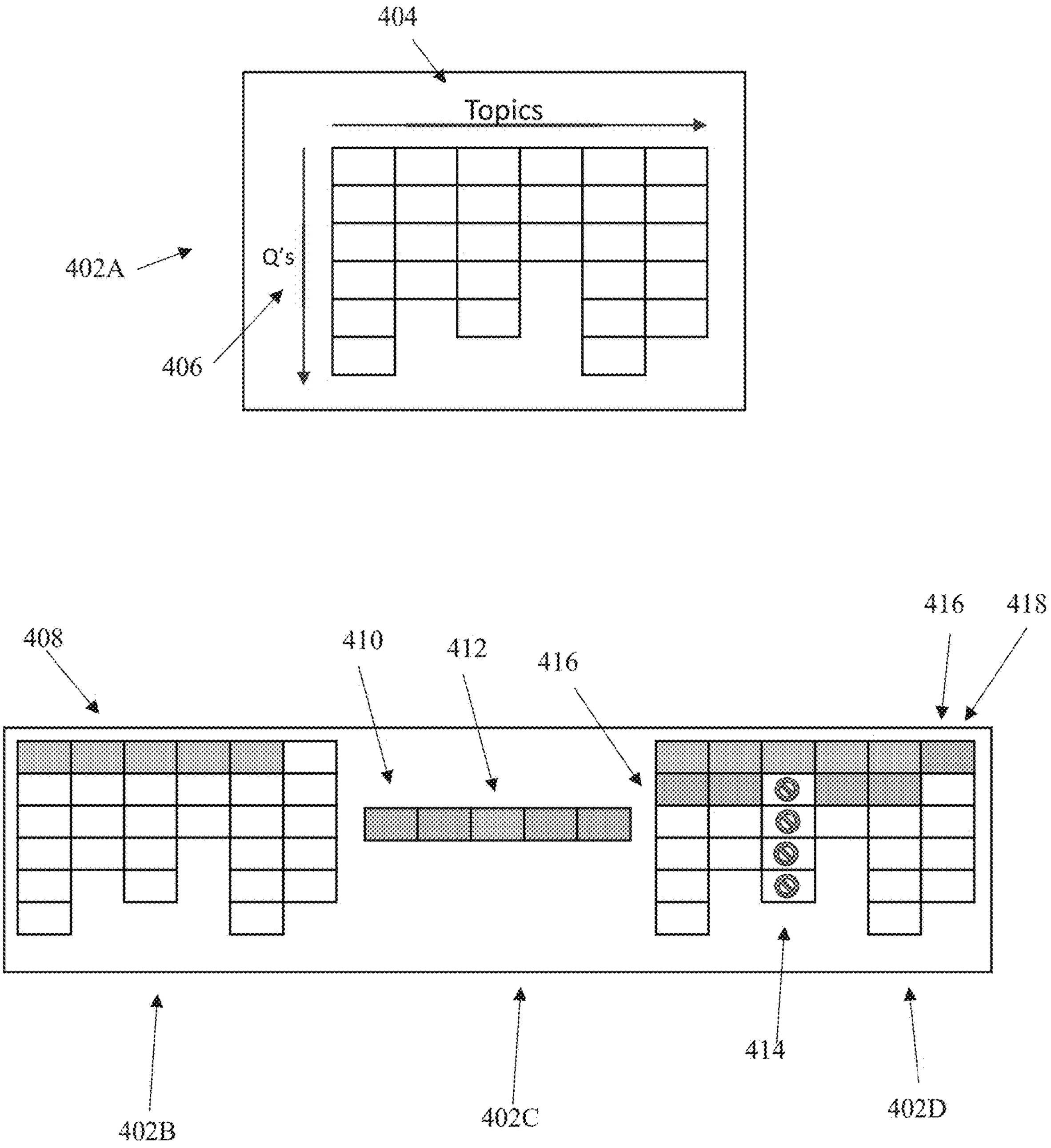
FIG. 4 includes schematics depicting an example of batch feeding of prompts into the LLM for classification of text, in accordance with some embodiments of the present invention.

Reference is now made to FIG. 1, which is a block diagram of components of a system for classifying a text using a LLM, in accordance with some embodiments of the present invention. Reference is also made to FIG. 2, which is a flowchart of a method of classifying a text using a LLM, in accordance with some embodiments of the present invention. Reference is also made to FIG. 3A, which is a pseudocode 302 for generating a batch of prompts of different topics for feeding into the LLM, in accordance with some embodiments of the present invention. Reference is also made to FIG. 3B, which is a pseudocode 304 for feeding the batch of prompts into the LLM, and collecting the responses generated by the LLM, in accordance with some embodiments of the present invention. Reference is now made to FIG. 3C, which is a pseudocode 306 for determining whether each topic is qualified or disqualified according to the respective response, and a state of the topic is changed to inactive accordingly, in accordance with some embodiments of the present invention. Reference is also made to FIG. 4, which includes schematics depicting an example of batch feeding of prompts into the LLM for classification of text, in accordance with some embodiments of the present invention.

System 100 may implement the acts of the method(s) described with reference to FIGS. 2-4, by processor(s) 102 of a computing environment 104 executing code instructions stored in a memory 106 (also referred to as a program store).

Computing environment 104 iteratively generates batches of prompts (e.g., from repository of prompts 122D) of different topics (e.g., from repository of topics 122C) for feeding into a LLM 122A for determining which topics correspond to a text 150, and classifying the text into a class (e.g., from repository of classes 122B), as described herein.

Computing environment 104 may be implemented as, for example one or more and/or combination of: a group of connected devices, a client terminal, a server, a web server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing environment 104 may be implemented. For example:

Computing environment 104 executing stored code instructions 106A, may be implemented as one or more servers (e.g., network server, web server, a computing cloud, and a virtual server) that provides centralized services (e.g., one or more of the acts described with reference to FIGS. 2-4). Services may be provided, for example, to one or more client terminals 108 over network 110, and/or to one or more server(s) 118 over network 110. Client terminals 108 may include for example, devices of users that wish to classify text 150. Server(s) 118 may include, for example, web servers that host websites and/or social network from which text 150 for classification may be obtained, and/or data storage servers that store text 150 for classification. Services may be provided to client terminals 108 and/or server(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or server(s) 118, and/or providing functions using a remote access session to the client terminals 108 and/or server(s) 118, such as through a web browser executed by client terminal 108 and/or server(s) 118 accessing a web sited hosted by computing environment 104. For example, text 150 is provided from one or more client terminal 108 for classification, for example, for determining whether an email is junk or legitimate. In another example, text 150 is provided for posting on server(s) 118 according to the classification, such as for searching by a search engine, automatic organization such as by category of online news articles, and the like. Computing environment 104 centrally analyzes the text 150 (as described herein) for obtaining a classification category. The classification category may be provided to the corresponding client terminal 108 and/or server 118, and/or associated with the text such as for automatic posting to a corpus for searching by a search engine, automatic placement in a folder according to the classification category, and the like.

Computing environment 104 may be implemented for local execution (i.e., include locally stored code instructions 106A) of one or more of the acts described with reference to FIGS. 2-4, for locally classification text 150, for example, for automatic sorting of emails according to category, automatic sorting of documents, and the like. The locally stored code instructions 106A may be obtained from a server, for example, by downloading the code over the network, and/or loading the code from a portable storage device. Text 150 may be obtained, for example, uploaded by a user via client terminal 108, stored by a data storage device such as by a server(s) 118, by a user manually entering a path where text 150 is stored, intercepting text 150 being transferred by user(s) across a network, and/or a user activating an application that automatically analyzes text 150 stored on computing environment 104 and/or accessed by computing environment 104 (e.g., over a network 110, and/or stored on a data storage device 122).

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method(s) described with reference to FIGS. 2-4 when executed by hardware processor(s) 102.

Computing environment 104 may include a data storage device 122 for storing data, such as one or more code based processes described herein, for example, LLM 122A, repository of classes 122B for classification of the text, repository of topics 122C where each class is associated with multiple topics, and repository of prompts 122D, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 and/or client terminal(s) 108 include and/or are in communication with one or more physical user interfaces 126 that include a mechanism for a user to enter data (e.g., manually designate the location of text 150 for classification) and/or view the displayed results (e.g., classification of text 150). Exemplary user interfaces 126 include, for example, one or more of, a touchscreen, a display, gesture activation devices, a keyboard, a mouse, and voice activated software using speakers and microphone.

Referring now back to FIG. 2, at 202, a text for classification into a class is provided and/or accessed.

The text may be provided, for example, manually entered by a user, accessed from a defined data storage location such as new email received in an inbox, as a gatekeeping process such as new comments being posted to a blog, intercepted during network transport such as by a firewall, and the like.

The text may be unstructured.

The text may be human readable text, for example, an email, an article, a document, and the like.

The text may be of varying lengths.

The class is defined as a super-category of multiple topics.

It is to be understood that the text for classification is an exemplary and not necessarily limiting embodiment. Other data for classification may be provided and/or accessed, for example, an image, audio, a video, and the like.

Some examples of classes for classification of the text, and topics associated with the class are now provided:

Class: Technology. Topics: Artificial Intelligence, Cybersecurity, Internet of Things (IoT), Cloud Computing, Robotics, and Blockchain.
Class: Politics. Topics: Elections, International Relations, Public Policy, Political Parties, Government Legislation, and Diplomacy.
Class: Health and Wellness. Topics: Nutrition, Exercise, Mental Health, Alternative Medicine, Chronic Diseases, and Preventive Care.
Class: Environment. Topics: Climate Change, Renewable Energy, Conservation, Pollution, Sustainable Living, and Biodiversity.
Class: Entertainment. Topics: Movies, Music, Television, Video Games, Celebrity News, and Theater.
Class: Business and Finance. Topics: Stock Market, Entrepreneurship, Corporate Management, Personal Finance, Economic Policy, and Marketing Strategies.
Class: Sports. Topics: Football, Basketball, Tennis, Olympics, Extreme Sports.

At 204, a batch of prompts corresponding to multiple topics of the class are provided and/or accessed.

Each respective topic is associated with at least one prompt for determining whether the text corresponds to the respective topic or not.

The prompts may be implemented as questions. The question may be designed to trigger generation of an answer by the LLM in response to being fed the question. The prompts, optionally questions, which may be hand-crafted questions and/or automatically generated questions such as by the LLM or another LLM.

As used herein, the terms prompt and question are sometimes interchanged.

In an exemplary implementation, two types of prompts, optionally questions, are defined. A first type may be a disqualifying type, designated to disqualify the text as belonging to the respective topic. A second type may be a qualifying type, designed to verify that the text belongs to the topic. In an exemplary implementation, first a question of the first type is asked to the LLM. If the text was not disqualified by the first type of question, a set of qualifying questions of the second type is then asked to the LLM.

Some examples of disqualifying questions for topics within the "Health and Wellness" class that may be used to prompt the LLM to determine whether to disqualify the text from a respective topic include:

Topic: Nutrition. Disqualifying Questions: Is the text primarily about cooking techniques without mentioning nutritional value? Does the content focus on food industry economics rather than health aspects? Is the text mainly about food history without discussing health implications?
Topic: Exercise. Disqualifying Questions: Is the text primarily about sports rules or regulations without mentioning health benefits? Does the content focus on exercise equipment manufacturing processes? Is the text mainly about professional athletes' careers without discussing fitness?
Topic: Mental Health. Disqualifying Questions: Is the text primarily about fictional portrayals of mental illness in media? Does the content focus on historical figures' biographies without discussing mental health? Is the text mainly about philosophical concepts unrelated to psychological well-being?
Topic: Alternative Medicine. Disqualifying Questions: Is the text primarily about religious practices without mentioning health effects? Does the content focus on the legal aspects of alternative medicine licensing? Is the text mainly about cultural traditions without discussing their healing properties?
Topic: Chronic Diseases. Disqualifying Questions: Is the text primarily about health insurance policies without discussing specific diseases? Does the content focus on hospital administration without mentioning patient care? Is the text mainly about medical technology manufacturing without discussing disease management?
Topic: Preventive Care. Disqualifying Questions: Is the text primarily about beauty products without mentioning health benefits? Does the content focus on fitness fashion trends without discussing preventive health measures? Is the text mainly about leisure activities without linking them to health prevention?

Some examples of qualifying questions for topics within the "Health and Wellness" class that may be used to prompt the LLM to determine whether to verify that the text belongs to the respective topic include:

Topic: Nutrition. Questions: Does the text discuss specific food groups or nutrients? Is there mention of dietary guidelines or meal planning? Does the content address the relationship between diet and health?
Topic: Exercise. Questions: Does the text describe specific physical activities or workout routines? Is there information about the benefits of regular exercise? Does the content mention fitness equipment or exercise techniques?
Topic: Mental Health. Questions: Does the text discuss psychological disorders or emotional well-being? Is there mention of therapy techniques or mental health treatments? Does the content address stress management or mindfulness practices?
Topic: Alternative Medicine. Questions: Does the text describe non-conventional medical practices or treatments? Is there mention of herbal remedies or natural healing methods? Does the content discuss the integration of alternative and conventional medicine?
Topic: Chronic Diseases. Questions: Does the text focus on long-term health conditions or their management? Is there information about symptoms, causes, or risk factors for specific diseases? Does the content address lifestyle changes for managing chronic conditions?
Topic: Preventive Care. Questions: Does the text discuss health screenings or early detection methods? Is there information about vaccinations or immunizations? Does the content address lifestyle choices that can prevent health issues?

A text classified into at least one topic of the multiple topics may be considered as belonging to the class.

Each topic is initially set to an active state. Prompts defined as being in the active state contribute one or more prompts for the batch. Prompts defined as being in an inactive state do not contribute prompts for the batch.

The prompts associated with a respective topic may be arranged such that a reply generated by the LLM to a prompt obtained in a current iteration is based on at least one preceding reply generated by the LLM in response to at least one preceding prompt obtained in at least one preceding iteration.

When a size of the batch is less than a number of topics in the active state, a single question of the batch corresponds to a single topic. Each topic contributes a single question.

Alternatively, or additionally, when a size of the batch is less than a number of topics in the active state, the prompts may be obtained from different combination of topics. The iterations may be over the topics in the active state.

Alternatively, or additionally, when a size of the batch is larger than a number of the topics in the active state, at least two prompts corresponding to a same topic are included in the batch.

Referring now back to FIG. 3A, pseudocode 302 for generating a batch of topics for feeding into the LLM is presented.

Referring now back to FIG. 2, at 206, the batch is fed to the LLM. The multiple prompts (e.g., questions) of the batch may be simultaneously fed into the LLM, for example, triggering a single call to the LLM.

The text may be fed into the LLM in combination with the batch at least in an initial iteration. For example, the text is fed into the LLM along with the prompt, such as by first feeding the text, and then asking the question (i.e., the prompt) on the text that was just inputted. In an next iteration, the prompt (e.g., question) may be directed to the initially inputted text, such as in LLM designed to "remember" the initial text.

At 208, replies generated by the LLM are accessed (e.g., received). The replies by the LLM may be responses to the prompts (e.g., questions) of the batch.

Referring now back to FIG. 3B, pseudocode 304 for feeding the batch of prompts into the LLM, and collecting the responses generated by the LLM, is presented.

Referring now back to FIG. 2, at 210, the replies generated by the LLM in response to the prompts (e.g., question) of the batch are analyzed. The analysis may be performed to determine whether the text corresponds to each respective topic or does not correspond to the respective topic.

As used herein, the terms corresponds, belongs to, associated with, and classified into, may sometimes be interchanged and/or are sometimes used interchangeably, for example, for describing a relationship between the text and the topic.

The analysis may be performed by determining whether a respective reply (e.g., each reply) generated by the LLM disqualifies the text for the respective topic, for example, when a disqualifying question and/or question of the first type is used.

The analysis may be performed by determining whether a respective reply (e.g., each reply) generated by the LLM or verifies that the text corresponds to the respective topic, for example, when a qualifying question and/or question of the second type is used.

The analysis may be performed by determining whether one or more replies generated by the LLM are insufficient to associate the text with the topic associated with the prompt (s) that generated the reply.

The analysis may be performed by attempting to classify the text into each respective topic according to the respective replies received by the LLM (in response to being fed the prompt(s) associated with the respective topic). The classification may be binary, indicating whether the text is classified into each respective topic or not. The classification may be performed by a binary classifier, optionally using a deterministic approach. The classifier, optionally the binary classifier, may classify the text according to an input of the response of the LLM to the prompt(s) associated with the topic. There may be multiple binary classifiers, one per topic.

Referring now back to FIG. 3C, pseudocode 306 for determining whether each topic is qualified or disqualified according to the respective response, and a state of the topic is changed to inactive accordingly, is presented.

Referring now back to FIG. 2, at 212, the state of the topic may be changed according to the analysis.

In response to the analysis indicating that the text is associated with the topic (e.g., the text is verified according to the response to the qualifying question being positive) and/or in response to the analysis indicating that the text is not associated with the topic (e.g., the text is disqualified according to the response to the disqualifying question being positive), the state of the topic may be changed from active to inactive.

A subset of the topics of the current batch for which the analysis determines that the text is associated with, is changed from the active state to the inactive state. The subset of topics may include: a single topic, two or more topics, all topics, or no topics.

Alternatively, when a determination that the text is associated with the topic cannot be made according to the analysis, the topic may remain in the active state. For example, the determination cannot accurately be made, such as an accuracy of the determination is below a predefined threshold.

At 214, one or more features described with reference to 202-212 are iterated.

In some embodiments one or more features described with reference to 204-212 are iterated for the same class. Iterations may be performed by selecting another batch from the different topics of the same class that are in the active state in each respective iteration. Topics which are in the inactive state are ignored and not included in the current batch.

The iterations may be terminated when all the topics are set to the inactive state, or no prompts remain. When a topic is defined as active, the topic may contribute a single prompt (e.g., question) for the batch. The iterations may proceed until the batch is full or no more prompts (e.g., questions) remain. A topic may contribute more than one question when the batch size (e.g., denoted S) is larger than the number of remaining active topics.

In some embodiments one or more features described with reference to 202-212 are iterated for each text of multiple texts for classifying each of the multiple texts into the class. Feature 216 follows the iterations for each text to classify each respective text into the class.

At 216, the text is classified into the class or not classified into the class according to an analysis of an aggregation of the subset of topics for which the active state was changed to the inactive state. Topics which remain inactive after the iterations are terminated are not considered in the analysis.

The classification of the text into the class may be predicted based on the outcomes of the binary classifiers, for example, using a set of rules, and the like. For example, the text is classified into a class when the text is classified into certain combinations of topics. Examples of deterministic binary classifiers include: a decision tree (without randomness), a support vector machine (SVM), logistic regression, rule-based classifier, and the like.

The text may be classified into the class in response to determining that the text is classified into at least one topic of the class.

It is noted that one or more features described with reference to 202-216 may be iterated for each class of multiple classes. A respective set of iterations described with reference to 202-124 may be performed for each individual class as described, followed by the feature described with reference to 216 to classify the text into the respective class. The iterations may be performed for identifying a subset of one or more classes that the text is classified to. Each class is associated with a different set of topics and a different set of corresponding prompts. The classification into each respective class may be performed independently of one another.

An example of a text that could be classified into the Health and Wellness class, along with an analysis of how it fits into certain topics and not others is now provided:

Example Text:

"Mindful Eating: A Path to Better Nutrition and Mental Health

In today's fast-paced world, many of us eat on autopilot, barely noticing what we put into our bodies. Mindful eating, a practice rooted in mindfulness meditation, can transform our relationship with food and improve both our physical and mental well-being. By paying attention to the colors, smells, textures, and flavors of our food, we not only enjoy our meals more but also make better nutritional choices. This approach can lead to improved digestion, weight management, and a reduction in stress-related eating behaviors.

Studies have shown that mindful eating can help individuals with chronic conditions such as diabetes better manage their blood sugar levels. Moreover, the practice encourages a deeper connection with our bodies, helping us recognize true hunger and fullness cues. This awareness can be particularly beneficial for those struggling with emotional eating or eating disorders.

Incorporating mindful eating into your daily routine doesn't require special equipment or a gym membership. It's a practice that can be done anywhere, anytime. Start by taking a few deep breaths before meals, eating without distractions like TV or phones, and chewing slowly. Over time, you may notice improvements in your overall health, energy levels, and even your mental clarity."

Classification Analysis:

Topics this text belongs to:

---

Nutrition: The text discusses making better nutritional choices and its impact on health. It mentions the relationship between mindful eating and weight management.
Mental Health: The content addresses the connection between eating habits and mental well-being. It discusses stress-related eating behaviors and emotional eating.
Chronic Diseases: The text mentions how mindful eating can help manage chronic conditions like diabetes.
Holistic Health: The content emphasizes the connection between physical eating habits and mental well-being. It discusses the integration of mindfulness (a mental practice) with nutrition (a physical aspect).

---

Topics this text does not belong to:

---

Exercise: The text doesn't mention physical activities or workout routines.
Alternative Medicine: While mindfulness is mentioned, it's not presented as an alternative to conventional medicine.
Preventive Care: The text doesn't discuss health screenings, vaccinations, or specific preventive measures.
Sleep Health: There's no mention of sleep patterns or how to improve sleep quality.

---

Classification based on belonging and non-belonging: This text would be primarily classified under the Health and Wellness class, with strong associations to the topics of Nutrition and Mental Health. It also has relevance to Chronic Diseases and Holistic Health. The text's focus on the mind-body connection through eating habits makes it a good fit for these topics. The absence of content related to Exercise, Alternative Medicine, Preventive Care, and Sleep Health helps to narrow down the classification. This ensures that the text isn't incorrectly categorized into these topics, despite being in the broader Health and Wellness class.

At 218, action may be taken in response to the classification of the text into the class, for example:

---

A tag or label indicating the class is generated and associated with the text, for example, as metadata added to the text, and/or as a mapping dataset that maps between the text and the tag or label.
The classified text is added to a corpus of classified texts. For example, news articles are automatically classified to posted to different websites of different topics of an online newspaper. In another example, emails are automatically sorted into different folders according to different classes. In yet another email, the corpus is included in a training dataset for training a machine learning model for automatic classification of text.
The corpus of classified texts may be arranged for at least one of: being searched by a search engine, being accessed by an index according to classification, and for a text to be presented on a display in association with classification of the text.

---

Referring now back to FIG. 4, schematics depicting an example of batch feeding of prompts into the LLM for classification of text are presented. The example described with reference to FIG. 4 may be implemented by components of system 100 described with reference to FIG. 1, and/or may be implemented by one or more features of the method described with reference to FIG. 2 and/or may be implemented by one or more pseudocodes described with reference to FIGS. 3A-3C.

Schematic 402A depicts multiple topics 404 (along an x-axis) and multiple prompts 406 (along a y-axis). In the example, there are K=6 topics, with a variable number of prompts per topic. In the example, the batch size is S=5.

Schematic 402B depicts iteration over the topics. A batch 408 of the first 5 prompts from the first 5 topics, i.e., the first prompt from each topic, is created.

Schematic 402C depicts responses 410 generated by the LLM to the 5 prompts. A response to the third question 412 is positive, indicating that the third question is associated with the third topic. The responses to the first, second, fourth, and fifth prompts did not indicate an association with their corresponding topics.

Schematic 402D depicts a second batch 416 of prompts of topics. The third topic 414 is placed in an inactive state, due to the response to the third prompt indicating association with the third topic. Second batch 416 includes a first question from the sixth topic 418 (which was not included in the first batch since the size of the batch was 5), and a second question from each of the first, second, forth, and fifth topics. No question is included from the third topic which has been deactivated.

Schematic 402E corresponds to schematic 402D.

Schematic 402F indicates that none of the responses to the prompts of the second batch corresponded to their respective topics.

Schematic 402G depicts a third batch 420 of prompts of topics. Third batch 420 includes a second question from the sixth topic, and a third question from each of the first, second, forth, and fifth topics. No question is included from the third topic which has been deactivated.

Schematic 402H corresponds to schematic 402G.

Schematic 402I indicates that the prompt of the fifth topic 422 (the fourth prompt in the third batch) is associated with the fifth topic.

Schematic 402J depicts a fourth batch 424 of prompts of topics. The fifth topic 426 is also placed in an inactive state, due to the response to the corresponding prompt indicating association with the fifth topic. Fourth batch 424 includes a third prompt from the sixth topic, a fourth prompt from the first topic, a fourth prompt from the second topic, no prompt from the third topic which has been deactivated, no prompt from the fourth topic since all prompts of the fourth topic have been used and no additional prompts exist, no prompt from the fifth topic which has been deactivated, a fourth prompt from the sixth topic (which has been accessed again in the same batch in an effort to collect five prompts), and a fifth prompt from the first topic (which has been accessed again in the same batch in an effort to collect five prompts).

Schematic 402K corresponds to schematic 402J.

Schematic 402L indicates that the prompt of the sixth topic 428 (the fourth prompt in the fourth batch) is associated with the sixth topic.

Schematic 402K depicts a fifth batch 430 of prompts of topics, which only includes the sixth prompt of the first topic. The sixth topic 432 is also placed in an inactive state, due to the response to the corresponding prompt indicating association with the sixth topic. From the remaining active topics, only the first topic includes prompts which have not yet been batched. The remaining sixth prompt of the first topic is included in the fifth batch, which is also the final batch in the iterations since there are no more remaining prompts of active topics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant LLMs will be developed and the scope of the term LLM is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of classifying a text, comprising:

accessing a text for classification into a class, wherein the class is defined as a super-category of a plurality of topics, wherein each respective topic of the plurality of topics is associated with at least one prompt for determining whether the text corresponds to the respective topic or not;

in a plurality of iterations:

obtaining a batch of a plurality of prompts, wherein the plurality of prompts correspond to the plurality of topics of the class, wherein the plurality of topics are obtained from topics defined as being in an active state;

feeding the batch to a large language model (LLM);

analyzing replies generated by the LLM in response to the batch to determine whether the text is classified into each respective topic of the plurality of topics or not;

changing from the active state to an inactive state for a subset of the plurality of topics to which the text is classified into respective topics according to the analysis, wherein in a subsequent iteration another batch is selected from topics remaining in the active state; and classifying the text into the class or not classifying the text into the class according to an analysis of an aggregation of the subset of the plurality of topics for which the active state was changed to the inactive state;

wherein at least one prompt associated with each respective topic comprises at least one disqualifying prompt designed to disqualify the text from corresponding to the respective topic and at least one qualifying prompt designed to verify that the text corresponds to the respective topic; and wherein analyzing the replies generated by the LLM comprises determining whether each reply generated by the LLM disqualifies the text for the respective topic or verifies that the text corresponds to the respective topic, and changing the state of the respective topic to the inactive state in response to the determining indicating that the text is disqualified or verified.

2. The computer implemented method of claim 1, wherein classifying the text into the class is performed in response to the analysis determining that the text is classified into at least one topic of the plurality of topics of the class.

3. The computer implemented method of claim 1, wherein analyzing replies comprises classifying the into each respective topic by a respective deterministic binary classifier trained for the topic according to an input of the replies of the LLM to the at least one prompt, wherein the text is classified into the class according to an analysis of the outcomes of a plurality of deterministic binary classifiers corresponding to the plurality of topics.

4. The computer implemented method of claim 1, further comprising adding the classified text to a corpus of classified texts.

5. The computer implemented method of claim 4, wherein the corpus of classified texts is arranged for at least one of: being searched by a search engine, being accessed by an index according to classification, and for a text to be presented on a display in association with classification of the text.

6. The computer implemented method of claim 1, wherein the plurality of iterations terminate when the plurality of topics are in the inactive state, or no prompts remain.

7. The computer implemented method of claim 1, wherein when a size of the batch is less than a number of the plurality of topics in the active state, a single prompt of the plurality of prompts of the batch corresponds to a single topic.

8. The computer implemented method of claim 1, wherein when a size of the batch is less than a number of the plurality of topics in the active state, the plurality of prompts are obtained from different combination of topics, wherein the plurality of iterations are over the plurality of topics in the active state.

9. The computer implemented method of claim 1, wherein when a size of the batch is larger than a number of the plurality of topics in the active state, at least two prompts corresponding to a same topic are included in the batch.

10. The computer implemented method of claim 1, wherein the text is unstructured.

11. The computer implemented method of claim 1, wherein the prompt comprises a question and the reply generated by the LLM comprises an answer to the question.

12. The computer implemented method of claim 1, wherein the at least one prompt associated with the respective topic comprises a plurality of prompts arranged such that a reply generated by the LLM to a prompt obtained in a current iteration is based on at least one preceding reply generated by the LLM in response to at least one preceding prompt obtained in at least one preceding iteration.

13. The computer implemented method of claim 1, wherein the analyzing the replies generated by the LLM is performed by a binary classifier that determines whether the text corresponds to the respective topic or not, wherein a different binary classifier is trained for each respective topic.

14. The computer implemented method of claim 1, wherein the text is fed into the LLM in combination with the batch at least in an initial iteration of the plurality of iterations.

15. The computer implemented method of claim 1, wherein the plurality of iterations are executed for each text of a plurality of texts for classifying the plurality of texts.

16. The computer implemented method of claim 1, wherein the plurality of iterations are executed for each class of a plurality of classes for identifying a subset of the plurality of classes that the text is classified to, each class is defined as the super-category of a different set of topics, wherein each respective topic of each class is associated with at least one different prompt for determining whether the text corresponds to the respective topic or not.

17. The computer implemented method of claim 1, wherein classification of the text into each class is implemented as a binary outcome.

18. A system for classifying a text, comprising:

at least one processor executing a code for:

accessing a text for classification into a class, wherein the class is defined as a super-category of a plurality of topics, wherein each respective topic of the plurality of topics is associated with at least one prompt for determining whether the text corresponds to the respective topic or not;

in a plurality of iterations:

obtaining a batch of a plurality of prompts, wherein the plurality of prompts correspond to the plurality of topics of the class, wherein the plurality of topics are obtained from topics defined as being in an active state;

feeding the batch to a large language model (LLM);

analyzing replies generated by the LLM in response to the batch to determine whether the text is classified into each respective topic of the plurality of topics or not;

changing from the active state to an inactive state for a subset of the plurality of topics to which the text is classified into respective topics according to the analysis, wherein in a subsequent iteration another batch is selected from topics remaining in the active state; and classifying the text into the class or not classifying the text into the class according to an analysis of an aggregation of the subset of the plurality of topics for which the active state was changed to the inactive state;

wherein at least one prompt associated with each respective topic comprises at least one disqualifying prompt designed to disqualify the text from corresponding to the respective topic and at least one qualifying prompt designed to verify that the text corresponds to the respective topic; and wherein analyzing the replies generated by the LLM comprises determining whether each reply generated by the LLM disqualifies the text for the respective topic or verifies that the text corresponds to the respective topic, and changing the state of the respective topic to the inactive state in response to the determining indicating that the text is disqualified or verified.

19. A non-transitory medium storing program instructions for classifying a text, which when executed by at least one processor, cause the at least one processor to:

access a text for classification into a class, wherein the class is defined as a super-category of a plurality of topics, wherein each respective topic of the plurality of topics is associated with at least one prompt for determining whether the text corresponds to the respective topic or not;

in a plurality of iterations:

obtain a batch of a plurality of prompts, wherein the plurality of prompts correspond to the plurality of topics of the class, wherein the plurality of topics are obtained from topics defined as being in an active state;

feed the batch to a large language model (LLM);

analyze replies generated by the LLM in response to the batch to determine whether the text is classified into each respective topic of the plurality of topics or not;

change from the active state to an inactive state for a subset of the plurality of topics to which the text is classified into respective topics according to the analysis, wherein in a subsequent iteration another batch is selected from topics remaining in the active state; and classify the text into the class or not classifying the text into the class according to an analysis of an aggregation of the subset of the plurality of topics for which the active state was changed to the inactive state;

wherein at least one prompt associated with each respective topic comprises at least one disqualifying prompt designed to disqualify the text from corresponding to the respective topic and at least one qualifying prompt designed to verify that the text corresponds to the respective topic; and wherein analyze replies generated by the LLM comprises determining whether each reply generated by the LLM disqualifies the text for the respective topic or verifies that the text corresponds to the respective topic, and changing the state of the respective topic to the inactive state in response to the determining indicating that the text is disqualified or verified.

* * * * *